W. F. DE BRANDT.
HARVESTING MACHINE.
APPLICATION FILED FEB. 26, 1919.

1,372,283.

Patented Mar. 22, 1921.

Inventor
William Francis de Brandt by Laurence Languir
Attorney

UNITED STATES PATENT OFFICE.

WILLIAM FRANCIS DE BRANDT, OF MELBOURNE, VICTORIA, AUSTRALIA, ASSIGNOR TO THE FOGARTY PATENT INTERCHANGEABLE HARVESTER CORPORATION LIMITED, OF PERTH, WESTERN AUSTRALIA, AUSTRALIA, A CORPORATION OF WESTERN AUSTRALIA.

HARVESTING-MACHINE.

1,372,283.  Specification of Letters Patent.  Patented Mar. 22, 1921.

Application filed February 26, 1919. Serial No. 279,399.

*To all whom it may concern:*

Be it known that I, WILLIAM FRANCIS DE BRANDT, a subject of the Republic of France, and resident of Melbourne, in the State of Victoria and Commonwealth of Australia, secretary, have invented certain new and useful Improvements in and Relating to Harvesting-Machines, of which the following is a specification.

This invention relates to improvements in harvesting machines and has been specially devised in order to provide a machine cheap in construction and capable of being readily transported.

An essential feature embodied in the invention consists of a three wheeled frame for harvesting mechanism consisting of two front wheels and a rear driving wheel, the latter being arranged centrally of the frame and between longitudinal frame beams arranged closely together.

Alternatively, the rear wheel may be arranged as a trailer and the drive may be imparted from one or both of the front wheels by bevel gear to a counter shaft from which the gear is controlled by clutch mechanism.

The invention is particularly adapted to a harvester frame wherein the draft appliances are arranged to the rear of the steering wheels and on both sides of the main frame, and wherein the reaping mechanism is mounted on a single pivot support being controlled so that it can be raised and lowered to suit the crop.

In order that the invention may be more readily understood it will now be described with reference to the accompanying drawings in which:—

Figure 1:
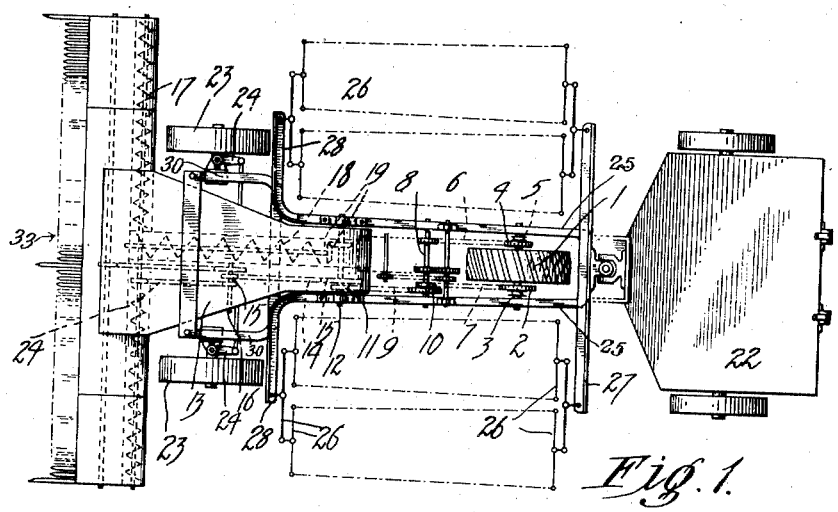
Figure 1 is a view in plan.
Figure 2:
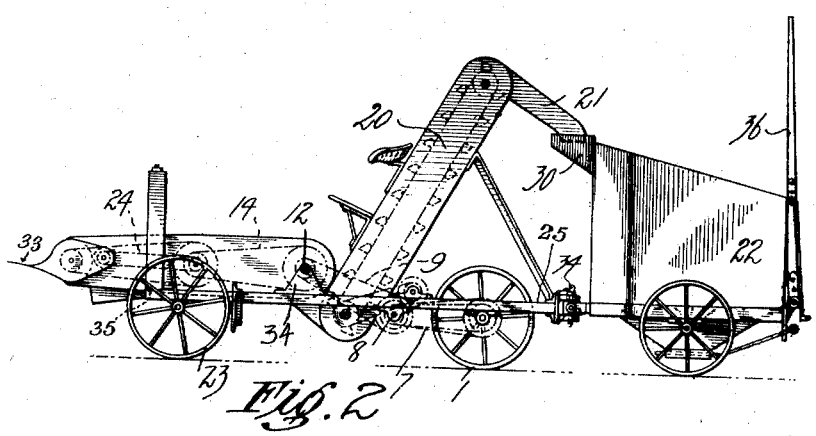
Fig. 2 is a view in side elevation of the invention.

According to this invention the rear wheel 1 is preferably the driving element, but it will be readily understood that the machine may be operated by a power generator on the frame, or partly by horse draft and partly by power or by horse draft alone.

The rear wheel 1 is substantially broad and is arranged in approximately the central line of the machine being provided on either side with two or more speed gears 2, 4, and clutch mechanism 3, 5, from which chain drives 6, 7 extend to a counter shaft 8, such counter shaft 8 driving by chain 9 and sprocket gears 10, 11, the single pivot spindle 12 of the frame 13 carrying the reaping mechanism 33, and from which spindle 12 the drive extends by chain 14 and sprockets 15 or V belts and V pulleys to and from a counter shaft 16 to the front reaping mechanism which consists of either knives or beaters, or knives and beaters, and transverse conveyers, 17, leading to a central longitudinal conveyer 18 which extends rearwardly and centrally of the machine within the reaper frame and driven by bevel gear 19 from the pivot spindle 12, the material from the conveyer 18 being delivered into an elevator 20 the material being then delivered through a chute 21 or a plurality of feeding chutes into a grain box 22.

The reaper frame 13 is mounted on the spindle 12 mounted in brackets 34 mounted on the longitudinal beams 25. The reaper frame 13 may be mounted to rotate on said spindle 12 so that the reaper mechanism 33 may be adjusted to various distances from the ground and in this case suitable adjusting means may be provided. If this adjustment is not desired the reaper frame 13 may be fixed in any suitable manner to the main frame or to the extension 30 thereof, or it may merely rest on a transverse beam secured to the extension 30.

In a modification, the drive may be imparted from the front wheels 23 and the rear wheel 1 in this case would be used as a trailer; such drive would preferably consist of a bevel on the wheel hub or hubs gearing with a bevel on a counter shaft from which the drive would be imparted to any portion of the machine.

The front wheels 23, in the construction illustrated, are fitted with stub axles 24 and are steered in any approved manner and the frame to which the invention is particularly adapted is constructed as illustrated comprising two longitudinal main beams 25 suitably supported being provided with horse draft appliances 26 on both sides to the rear of the front wheels 23, the rear draft beam 27 being arranged forwardly of, adjacent to, or as illustrated immediately to the rear of the single rear wheel 1 above described while the front draft beam 28 is arranged to the rear of the front wheels 23, being preferably rigidly affixed and fitted with swingle trees adapted to connect the traces to maintain the horses in the direct line of travel of the machines.

The two longitudinal main beams 25 are bent outwardly at their forward ends to form the front draft beam 28 to which the draft appliances 26 are connected. Forward extensions 30 are provided on the main beams for supporting the steering wheels, the latter being thus located between the draft animals and the reaper mechanism 33.

This construction allows of the grain to be stripped and delivered to a grain box 22 as illustrated.

It will be readily understood that any suitable grain box or threshing and winnowing mechanism may be used in combination with the invention herein described and further, the invention may be adapted to a stripper or header harvester or reaper thresher as desired, or be used in combination with any separate winnowing mechanism.

What I claim as my invention and desire to secure by Letters Patent is—

In a harvesting machine, a main frame comprising two parallel main beams, the forward ends of which are bent to extend outwardly to provide supports for draft appliances; a forward extension on said main frame; steering wheels mounted in said extension and located forwardly of the said bent ends of the main frame; a draft beam secured to the main frame at the rear thereof; a single ground wheel mounted in the main frame between the main beams forwardly of and adjacent the draft beam; a reaper mounted in the main frame and comprising a stripping element located forwardly of the steering wheels; a grain box connected to the main frame at the rear thereof; means for conveying the stripped grain from the stripping element to the grain box; and means operated by the single ground wheel for operating said conveying means as the machine travels.

Signed at Melbourne, in the State of Victoria, and Commonwealth of Australia, this 6th day of January, A. D. 1918.

WILLIAM FRANCIS DE BRANDT.

Witnesses:
SIDNEY HENDLEY,
ANNIE EDWARD.